(12) United States Patent
Smith et al.

(10) Patent No.: US 6,774,707 B1
(45) Date of Patent: Aug. 10, 2004

(54) CHARGE PUMP CIRCUITS AND METHODS

(75) Inventors: Mian Smith, Los Altos, CA (US); Myron Wong, Fremont, CA (US); Guu Lin, San Jose, CA (US); Stephanie Tran, San Jose, CA (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 10/050,004

(22) Filed: Jan. 14, 2002

(51) Int. Cl.[7] .............................. G05F 1/10; G05F 3/03
(52) U.S. Cl. ....................................................... 327/536
(58) Field of Search ................................ 327/536, 537, 327/589; 363/59, 60

(56) References Cited

U.S. PATENT DOCUMENTS

| | | | |
|---|---|---|---|
| 5,015,884 A | 5/1991 | Agrawal et al. | 326/39 |
| 5,121,006 A | 6/1992 | Pedersen | 326/38 |
| 5,225,719 A | 7/1993 | Agrawal et al. | 326/38 |
| 5,309,046 A | 5/1994 | Steele | 326/39 |
| 5,350,954 A | 9/1994 | Patel | 326/39 |
| 5,475,335 A | 12/1995 | Merrill et al. | |
| 5,905,291 A * | 5/1999 | Utsunomiya et al. | 257/392 |
| 5,978,283 A | 11/1999 | Hsu et al. | |
| 6,037,622 A | 3/2000 | Lin et al. | |
| 6,097,161 A | 8/2000 | Takano et al. | |
| 6,107,864 A | 8/2000 | Fukushima et al. | |
| 6,157,242 A * | 12/2000 | Fukui | 327/536 |
| 2002/0125935 A1 * | 9/2002 | Sawada et al. | 327/536 |

FOREIGN PATENT DOCUMENTS

JP       61254078 A  * 11/1986  ............ H02M/7/25

OTHER PUBLICATIONS

"XC95144 In–System Programmable CPLD," version 4.0, Xilinx, Inc., 2100 Logic Drive San Jose, CA 95124 (1998).

* cited by examiner

*Primary Examiner*—Terry D. Cunningham
*Assistant Examiner*—Quan Tra
(74) *Attorney, Agent, or Firm*—Townsend and Townsend and Crew LLP; Steven J. Cahill

(57) ABSTRACT

Charge pump circuits and methods of the present invention step up an input voltage to provide an output voltage. The charge pump circuits have one or more stages. Each stage may include a capacitor and a transistor. Each stage adds an incremental voltage to an input voltage. The capacitors elevate the voltage at a terminal of the transistors in each stage in response to a clock signal to provide the incremental voltage. The output voltage is the sum of the input voltage and the incremental voltages provided by each stage. One or more of the stages of the charge pump circuit may have a depletion transistor. Depletion transistors may be field-effect transistors that have a lower threshold voltage as a result of an implant in the channel region of the device.

24 Claims, 5 Drawing Sheets

CHARGE PUMP CIRCUITS AND METHODS

BACKGROUND OF THE INVENTION

The present invention relates to charge pump circuits and methods, and more particularly, to charge pumps that provide a greater output voltage or use less stages.

Integrated circuits tend to run at low power supply voltages to reduce power consumption and accommodate process shrinking. However, certain elements within an integrated circuit may require a higher voltage such as electrically erasable programmable read-only memory cells (EEPROMs). When the available power supply cannot provide the required high voltage and the on-chip high voltage generation is in demand, the integrated circuit can include a charge pump circuit.

A charge pump circuit is a power supply circuit that boosts a power supply voltage to a higher voltage at an output. A charge pump circuit may include a plurality of pump stages that step up the supply voltage level. The each stage of the charge pump circuit has a pump capacitor and a transistor associated with it. As the source voltage at the transistor in each subsequent stage of the charge pump increases, the threshold voltage the transistor also increases.

In higher voltage stages of the charge pump, less current flows through the transistor toward the output terminal, degrading the performance of the charge pump, because of the increased threshold voltage in the higher voltage stages. The increased threshold voltage limits the number of stages that can be coupled together, and limits the upper range of the output voltage. It would therefore be desirable to provide charge pump circuits that extend the upper range of the output voltage relative to the input voltage to provide a high output voltage for low supply voltage applications.

BRIEF SUMMARY OF THE INVENTION

Charge pump circuits and methods of the present invention step up an input voltage to provide an output voltage. The charge pump circuits have one or more stages. Each stage may include a capacitor and a transistor. Each stage adds an incremental voltage to an input voltage. The capacitors elevate the voltage at a terminal of the transistors in each stage in response to a clock signal to provide the incremental voltage. The output voltage is the sum of the input voltage and the incremental voltages provided by each stage.

One or more of the stages of the charge pump circuit have a depletion transistor. Depletion transistors may be field-effect transistors that have a negative threshold voltage (at a zero source bias) as a result of an implant in the channel region of the device. The depletion transistors allow more current to flow to the output voltage in higher voltage stages of the charge pump, because the lower threshold voltage of depletion transistors provide improved current conductivity at higher source voltages.

The charge pump stages with depletion transistors can provide a greater incremental voltage increase than stages with native devices. Charge pumps of the present invention can provide a greater output voltage, or an equivalent output voltage using less stages, than prior art charge pumps. Charge pumps of the present invention may be used, for example, in programmable logic devices, application specific integrated circuits, processors, and memory devices.

DETAILED DESCRIPTION OF THE INVENTION

Figure 1:
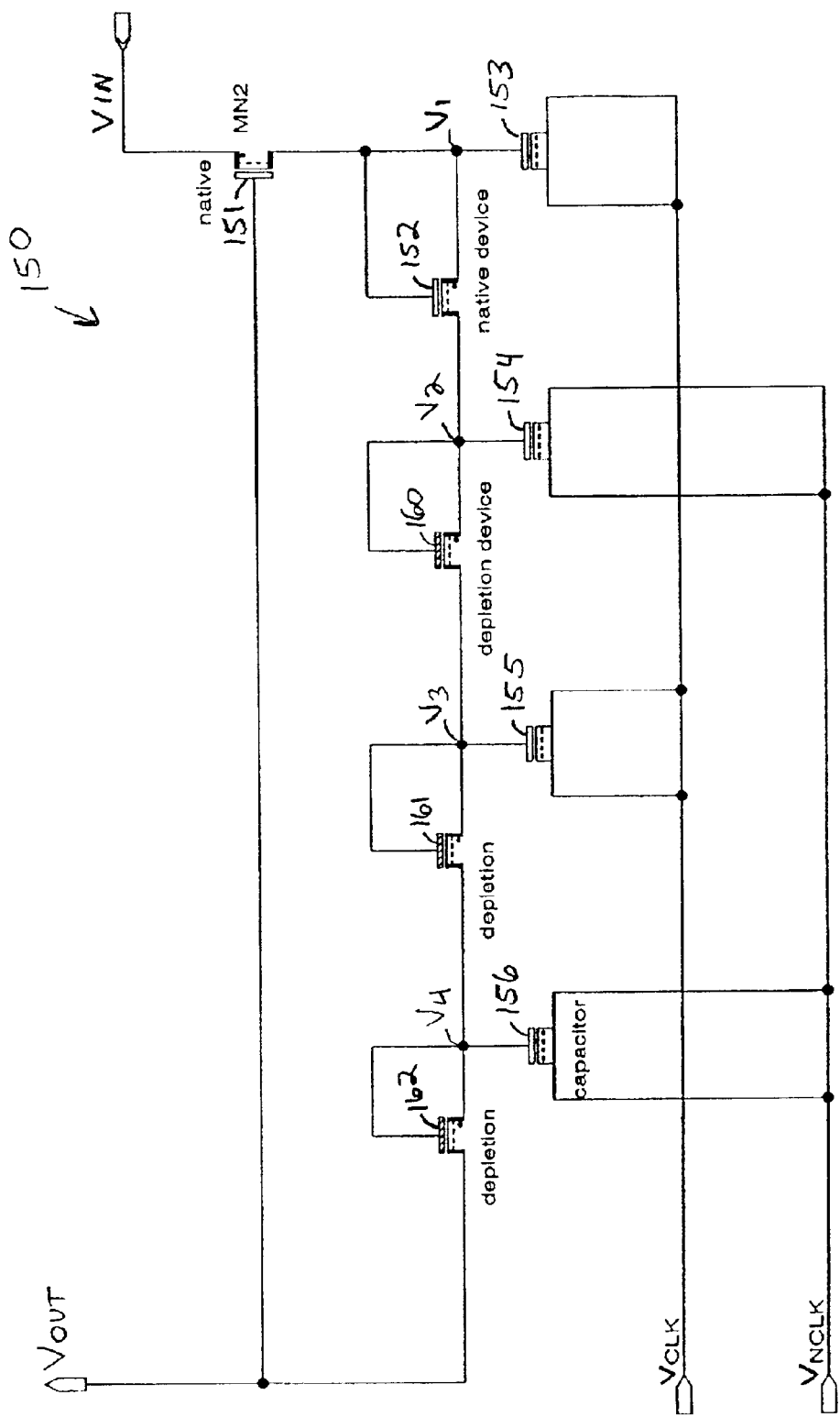
FIG. 1 illustrates a schematic of a first embodiment of a charge pump circuit, in accordance with the present invention.

Charge pump circuit 150 shown in FIG. 1 is a first embodiment of the present invention. Charge pump 150 steps up an input voltage $V_{IN}$ (e.g., 14 volts) and provides an output voltage $V_{OUT}$ (e.g., 16 volts). Charge pump 150 includes native field-effect transistors (FETs) 151 and 152, capacitors 153–156, and depletion FETs 160–162. Transistors 152 and 160–162 are coupled in series between transistor 151 and $V_{OUT}$ in diode connections. Charge pump 150 has four stages. Stage one comprises transistor 152 and capacitor 153, stage two comprises transistor 160 and capacitor 154, stage three comprises transistor 161 and capacitor 155, and stage four comprises transistor 162 and capacitor 156.

The lower plates of capacitors 153 and 155 are coupled to receive a first clock signal $V_{CLK}$. The lower plates of capacitors 154 and 156 are coupled to receive a second clock signal $V_{NCLK}$. Clock signals $V_{CLK}$ and $V_{NCLK}$ are periodic digital clock signals that vary between a supply voltage $V_{CC}$ and ground. $V_{CLK}$ and $V_{NCLK}$ are non-overlapping clock signals that are out of phase with each other.

Figure 2:
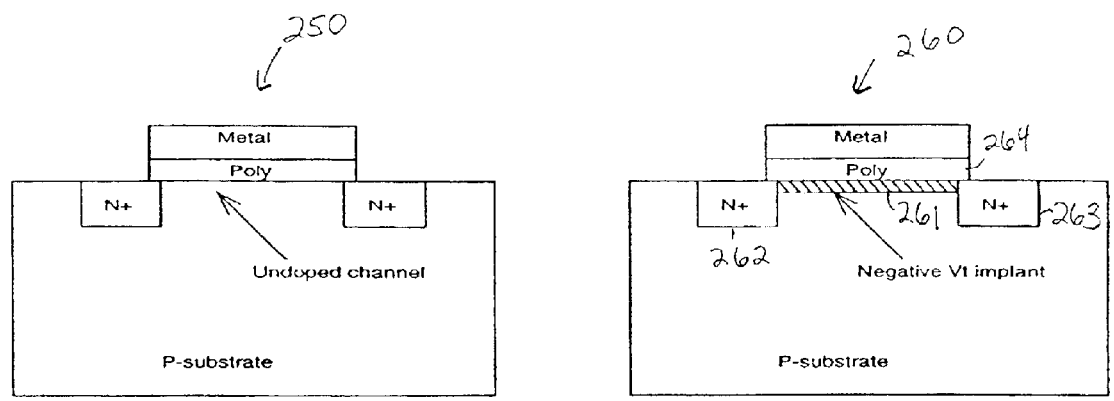
FIG. 2 illustrates cross sectional views of an n-channel native field-effect transistor, a n-channel depletion field-effect transistor, and corresponding current-voltage curves, in accordance with the present invention.
Figure 2:
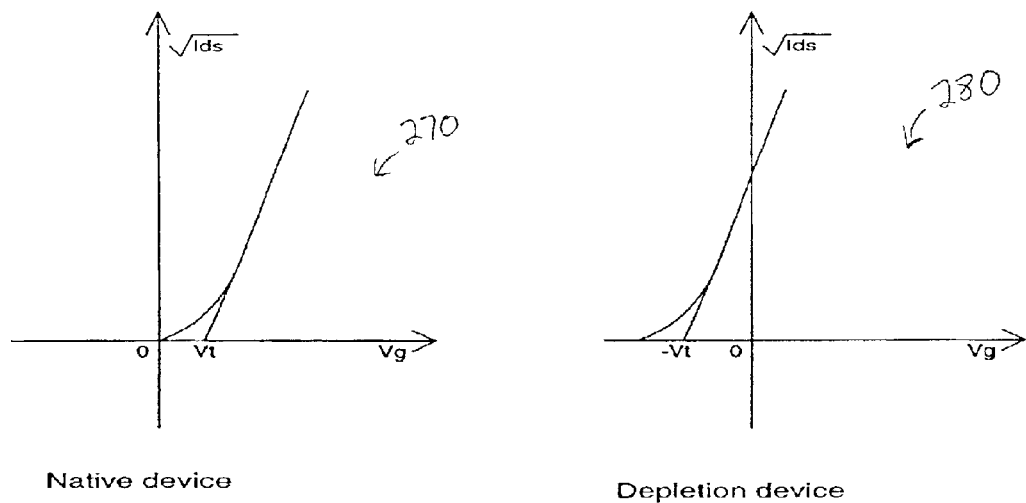

An example of a native FET is illustrated in cross section in FIG. 2. Native n-channel FET 250 includes a p-type substrate, drain/source N+ regions, and a polysilicon gate. FET 250 does not have a threshold voltage implant in its channel region beneath the gate. Therefore, the threshold voltage of FET 250 is greater than zero (e.g., 0.3 volts) as shown in graph 270.

An example of a depletion FET is also illustrated in cross section in FIG. 2. Depletion FET 260 includes a p-type substrate, drain and source N+ regions 262–263, and a polysilicon gate 264. FET 260 has a threshold voltage implant region 261 in its channel region beneath gate 264 between N+ drain/source regions 262 and 263. Region 261 is a shallow region implanted with n-type dopants during the fabrication process. Region 261 reduces the threshold voltage of FET 260 by adding additional charge carriers into the channel. The threshold voltage of FET 260 is less than zero (e.g., −0.3 volts) as shown in graph 280, when its source voltage is zero volts.

As the source voltage of a FET (such as FETs 250 and 260) increases, the threshold voltage of the FET also increases (but not in proportion the source voltage). If the source voltage of depletion FET 260 increases sufficiently, its threshold voltage rises above zero. However, the threshold voltage of FET 260 is less than the threshold voltage of FET 250 at a common source voltage.

Referring again to FIG. 1, the operation of charge pump 150 is now discussed Initially, $V_1$–$V_4$ and $V_{OUT}$ are 0 volts. Native FET 151 is connected between $V_{IN}$ and $V_1$, and its gate is connected to $V_{OUT}$. $V_{CC}$ is the power supply, e.g., 1.6 volts. When $V_{OUT}$ is initially set to $V_{CC}$ through another FET (not shown), FET 151 passes part of $V_{IN}$ to $V_1$, so that $V_1$ becomes $(V_{CC}-V_{T,NAT})$ at $V_{CLK}=0$, where $V_{T,NAT}$ is the threshold voltage of FETs 151 and 152. The gate and the drain of native FET 152 are coupled to the upper plate of capacitor 153 at $V_1$.

When $V_{CLK}$ goes to HIGH (i.e., $V_{CLK}$ rises $V_{CC}$), voltage $V_1$ at the gate of native FET 152 also steps up to above $(V_{CC}-V_{T,NAT})$. However, $V_1$ does not step all of the way up to $(V_{CC}-V_{T,NAT}+V_{CC})$, because of parasitic capacitance. A factor associated with capacitors 153–156 referred to as coupling ratio (C') determines the voltage on the upper plate of one of these capacitors when the voltage on the lower plate steps up. The coupling ratio of capacitors 153–156 may be, for example, 0.90–0.95. Therefore, when $V_{CLK}$ is HIGH, $V_1$ rises to $(V_{CC}-V_{T,NAT}+C'^*V_{CC})$. $V_{NCLK}$, is LOW (0 volts) when $V_{CLK}$ is HIGH.

$V_1$ is greater than the threshold voltage of FET 152. Therefore, FET 152 is ON, and current flows through FET 152 to capacitor 154. $V_2$ rises to approximately $V_{CC}-2V_{T,NAT}+(C'^*V_{CC})$.

When $V_{CLK}$ goes LOW (0 volts) and $V_{NCLK}$ goes HIGH (i.e., $V_{NCLK}$ rises to $V_{CC}$), voltage $V_2$ rises according to the coupling ratio C' of capacitor 154. $V_2$ rises to about $V_{CC}-2V_{T,NAT}+2(C'^*V_{CC})$. The threshold voltage of depletion FET 160 is less than the threshold voltage of FET 152. The threshold voltage of FET 160 may be negative or positive, depending on $V_{IN}$. Depletion FET 160 is ON, and current flows through FET 160 from capacitor 154 to capacitor 155, causing $V_3$ to rise to about $V_{CC}-2V_{T,NAT}+2(C'^*V_{CC})$. Depletion FET 160 causes to conduct current until $V_3$ reaches $V_2$, if the threshold voltage of FET 160 is zero or less than zero. If the threshold voltage of FET 160 is positive, $V_3$ is less than $V_2$ by the threshold voltage of FET 160.

When $V_{CLK}$ goes HIGH and $V_{NCLK}$ goes LOW again, voltage $V_3$ rises according to the coupling ratio C' of capacitor 155. $V_3$ rises to approximately $V_{CC}-2V_{T,NAT}+3(C'^*V_{CC})$. The threshold voltage of FET 161 may be negative or positive, depending on $V_{IN}$. Depletion FET 161 is ON, and current flows through FET 161 from capacitor 155 to capacitor 156, causing $V_4$ to rise to about $V_{CC}-2V_{T,NAT}+3(C'^*V_{CC})$. Depletion FET 160 continues to conduct current until $V_4$ reaches $V_3$, if the threshold voltage of FET 161 is negative. If the threshold voltage of FET 161 is positive, $V_4$ is less than $V_3$ by the threshold voltage of FET 161.

When $V_{CLK}$ goes LOW and $V_{NCLK}$ goes HIGH again, voltage $V_4$ rises according to the coupling ratio C' of capacitor 156. $V_4$ rises to approximately $V_{CC}-2V_{T,NAT}+4(C'^*V_{CC})$. Depletion FET 162 is ON, and current flows through depletion FET 162 from capacitor 156 to $V_{OUT}$, causing $V_{OUT}$ to rise to about $V_{CC}-2V_{T,NAT}+4(C'^*V_{CC})$.

If the threshold voltage of FET 162 is positive, $V_{OUT}$ is less than $V_4$ by the threshold voltage of FET 162. An output capacitor (not shown) is coupled to $V_{OUT}$. When $V_{OUT}$ rises to about $V_{CC}-2^*V_{T,NAT}+4(C'^*V_{CC})$ (higher than its initial voltage $V_{CC}$), $V_1$ now rises to $(V_{OUT}-V_{T,NAT})$. When $V_{CLK}$ goes HIGH and $V_{NCLK}$ goes LOW again, $V_1$ steps up to $(V_{OUT}-V_{T,NAT}+C'^*V_{CC})$. Voltages $V_2-V_4$ also step up accordingly. This cycle eventually brings $V_{OUT}$ equal to $V_{IN}$ and then above $V_{IN}$, allowing $V_{IN}$ to fully pass to $V_1$ when $V_{CLK}$ is LOW. The final output voltage $V_{OUT}$ value depends on the $V_{IN}$ value, the number of pump stages and the threshold voltages.

Charge pump circuit 150 is a four stage power supply that steps up the voltage at $V_{IN}$ to provide an output voltage $V_{OUT}$. Each stage incrementally increases voltages $V_1$, $V_2$, $V_3$, and $V_4$ by a factor of $(C'^*V_{CC}-V_T)$. As the voltages $V_1$, $V_2$, $V_3$, $V_4$, and $V_{OUT}$ increase, threshold voltages of FETs 151–152 and 160–162 also increase. If FETs 160–162 were native devices, their threshold voltages would become more positive, which reduces the incremental voltage that each stage adds to the output voltage.

In charge pump 150, FETs 160–162 are depletion devices. FETs 160–162 have threshold voltages that are substantially less than comparable native devices that are biased with the same voltages. The threshold voltages of FETs 160–162 are significantly less than comparably biased native devices. Depletion FETs 160–162 each provide a greater incremental voltage to $V_{OUT}$ than comparably biased native devices, because FETs 160–162 have lower threshold voltages. Therefore, charge pump 150 provides a greater output voltage $V_{OUT}$ than a four-stage charge pump with all native devices. Charge pump 150 is particularly useful at a high input voltage (e.g., 14 volts) that significantly raises the threshold voltages of FETs 152 and 160–162.

In circuit 150, reverse current can flow backwards away from $V_{OUT}$ through any of FETs 160–162 that have zero or negative threshold voltages. For example, reverse current can flow through FET 160 from capacitor 155 to capacitor 154. The gate-source voltage of FET 160 is zero in the case of reverse current, because the gate and source terminals are coupled together and to capacitor 154. FET 160 is ON, opening a path for reverse current, if it has a negative or zero threshold voltage. When clock signal $V_{NCLK}$ is LOW and $V_{CLK}$ is HIGH, reverse current can flow from capacitor 155 back to capacitor 154 through FET 160, reducing the voltage at capacitor 155. However, the forward current that flows through FET 160 from capacitor 154 to capacitor 155 is greater than the reverse current. Therefore, the net flow of current through each stage of charge pump 150 is toward output $V_{OUT}$.

Reverse current does not flow through FET 152 from capacitor 154 to capacitor 153 or through any of FETs 160–162 that have positive threshold voltages. The threshold voltages of FETs 152 and 160–162 depend on $V_{IN}$ and $V_1-V_4$. Clock cycles quickly step up $V_{OUT}$ to above $V_{IN}$, and $V_{OUT}$ reaches its stable value. At this time, all of voltages $V_1-V_4$ are near or above $V_{IN}$ (a high voltage state), and FETs 152 and 160–162 all have high source biases and thus higher threshold voltages. Higher threshold voltages significantly reduce or eliminate the reverse current flow.

Figure 3:
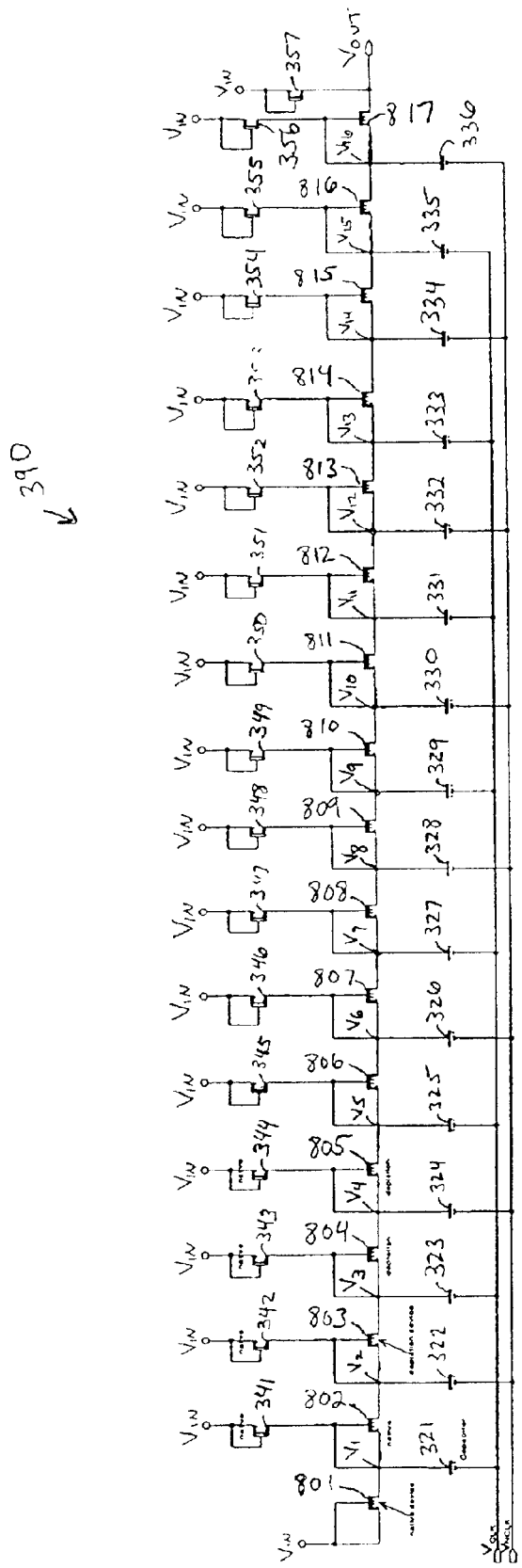
FIG. 3 illustrates a second embodiment of a charge pump circuit, in accordance with the present invention.

Charge pump circuit 390 illustrated in FIG. 3 is a second embodiment of the present invention. Charge pump 390 includes field-effect transistors (FETs) 801 817, FETs 341–357, and capacitors 321–336. The lower plates of capacitors 321, 323, 325, 327, 329, 331, 333, and 335 are coupled to receive first periodic digital clock signal $V_{CLK}$. The lower plates of capacitors 322, 324, 326, 328, 330, 332, 334, and 336 are coupled to receive second periodic digital clock signal $V_{NCLK}$. Clock signals $V_{CLK}$ and $V_{NCLK}$ are non-overlapping and are out-of-phase with each other. Clocks signals $V_{CLK}$ and $V_{NCLK}$ vary between 0 volts (LOW) and $V_{CC}$ (HIGH). In circuit 390, $V_{CC}$ may equal $V_{IN}$.

Charge pump 390 includes 16 stages that step up an initial input voltage $V_{IN}$ to provide an output voltage $V_{OUT}$. Each stage of charge pump 390 provides an incremental increase in the voltage of the previous stage. The 16 stages coupled together can generate a output voltage that is substantially higher than the input voltage. For example, $V_{IN}$ may be 1.6 volts, $V_{OUT}$ may be 15 volts, and the threshold voltages of the native FETs may be 0.3 volts.

Each stage includes one of FETs 802–817. The gates of FETs 802–817 are coupled to the upper plates of capacitors 321–336, respectively. FETs 341–356 are coupled to the gates of FETs 802–817, respectively. FETs 801–802 and FETs 341–357 are all native devices that may be fabricated as shown, for example, in FIG. 2. FETs 803–817 are depletion devices that may be fabricated as shown, for example, in FIG. 2.

FETs 341–356 are diode-connected transistors that set a minimum voltage for $V_{1-16}$ at the gates of FETs 802–817. $V_{1-16}$ and $V_{OUT}$ initially equal $V_{IN}-V_{T,NAT}$ before the first cycle of the clock signals. $V_{T,NAT}$ is the threshold voltage of native transistors 801–802 and 341–357. The coupling coefficient C' of capacitors 321–336 is typically less than 1 (e.g., 0.90–0.95).

When $V_{CLK}$ goes HIGH and $V_{NCLK}$ goes LOW, $V_1$ rises to approximately $(V_{IN}-V_{T,NAT})+C'*V_{CC}$. FET 802 turns ON, and current flows from capacitor 321 to capacitor 322. Voltage $V_2$ rises from $V_{IN}-V_{T,NAT}$ to approximately $(V_{IN}-2V_{T,NAT})+C'*V_{CC}$. The threshold voltages $V_{T,NAT}$ of FETs 801–802 are relatively small (e.g., 0.3), but increase slightly as the source voltages increase. With $V_1$ and $V_2$ both above $V_{IN}-V_{T,NAT}$, FETs 341 and 342 are both OFF.

When $V_{NCLK}$ goes HIGH and $V_{CLK}$ goes LOW, $V_2$ rises to approximately $(V_{IN}-2V_{T,NAT})+2(C'*V_{CC})$. FET 802 turns OFF, because it has a positive threshold voltage, and FET 803 is ON. Current flows through depletion FET 803 from capacitor 322 to capacitor 323. Voltage $V_3$ rises to approximately $(V_{IN}-2V_{T,NAT})+2(C'*V_{CC})$. $V_3$ is not reduced by the threshold voltage of depletion FET 803, if depletion FET 803 has a negative or zero threshold voltage.

When $V_{CLK}$ goes HIGH and $V_{NCLK}$ goes LOW again, $V_3$ rises to approximately $(VN_{IN}-2V_{T,NAT})+3(C'*V_{CC})$, and current flows through depletion FET 804 until $V_4$ rises to approximately $(V_{IN}-2V_{T,NAT})+3(C'*V_{CC})$. The threshold voltage of depletion FET 804 may be less than or equal to zero, in which case current continues to flow through FET 804 until $V_4$ equals $V_3$. With $V_3$ and $V_4$ both above $V_{IN}-V_{T,NAT}$, FETs 343 and 344 are OFF.

These steps repeat for FETs 805–817 in the higher voltage stages. Each of the voltages from $V_1$ to $V_{16}$ get incrementally higher by a factor approximately equal to $(C'\cdot V_{CC}-V_T)$. As voltages $V_1$ to $V_{16}$ incrementally increase, the threshold voltage of depletion FETs 803–817 is greater than the threshold voltage of depletion FETs in previous stages. For example, the threshold voltage of FET 810 is higher than the threshold voltage of FET 808, because $V_{10}$ is higher than $V_8$. The threshold voltage of depletion FETs 803–817 may vary, for example, from −0.3 to +0.7 volts. The threshold voltage for FETs 801–802 may, for example, be in the range of +0.3 to +0.8 volts.

Reverse current can flow away from $V_{OUT}$ through depletion FETs 803–817 that have a negative or zero threshold voltage. For example, current can flow from capacitor 323 to capacitor 322 through FET 803 when $V_{CLK}$ is HIGH. However, the net current flow toward $V_{OUT}$ is positive.

At some point in the chain of depletion FETs 803–817, the threshold voltages of all the subsequent depletion FETs exceeds zero. This may occur, for example, at FET 807. In this example, the threshold voltages of FETs 803–806 are less than zero or zero, and the threshold voltages of FETs 807–817 are greater than zero. FETs 807–817 prevent reverse current from flowing away from $V_{OUT}$ (to the left in FIG. 3), because they have positive threshold voltages and their gate-source voltages are zero in the reverse current direction.

The positive threshold voltages of FETs 807–817 reduce the amount of current flowing to the right in FIG. 3 toward $V_{OUT}$. As the threshold voltages of FETs 807–817 increase in each higher voltage stage, the incremental voltage increase provided by each stage above FET 807 becomes smaller and smaller. For example, the threshold voltage of FET 817 may be high enough so that FET 817 only provides a small voltage increase from $V_{16}$ to $V_{OUT}$. There is a limit on how many stages can be added to multi-stage charge pump circuit 390, because stages in addition to FETs 802–817 provide little or no additional voltage to $V_{OUT}$. However, charge pump 390 has more stages than prior art charge pumps with all native devices. As a result, charge pump 390 is able to provide a greater output voltage.

Figure 4:
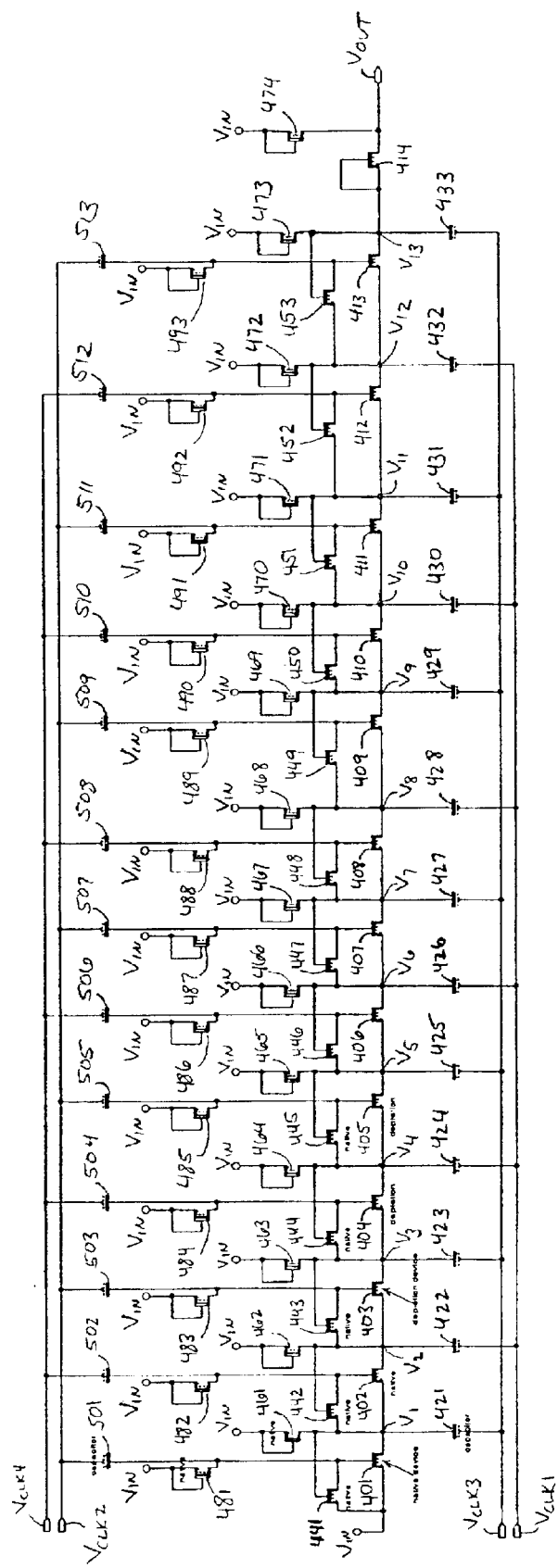
FIG. 4 illustrates a third embodiment of a charge pump circuit, in accordance with the present invention.

Charge pump circuit 400 illustrated in FIG. 4 is a third embodiment of the present invention Charge pump circuit 400 has 13 stages that step up input voltage $V_{IN}$ to provide output voltage $V_{OUT}$. Each stage includes one of n-channel FETs 401–413. N-channel FETs 401–414 are coupled in series between input voltage $V_{IN}$ and output voltage $V_{OUT}$. FETs 401–402 are native devices, and FETs 403–414 are depletion devices as shown, for example, in FIG. 2.

Charge pump 400 also includes n-channel FETs 441–453, n-channel FETs 461–474, n-channel FETs 481–493, capacitors 421–433, and capacitors 501–513. FETs 441–447 are native devices, and FETs 448–453 are depletion devices. FETs 461–474 are native devices. FETs 481–493 are native devices.

Capacitors 421, 423, 425, 427, 429, 431, and 433 are coupled to receive periodic digital clock signal $V_{CLK3}$. Capacitors 422, 424, 426, 428, 430, and 432 are coupled to a receive periodic digital clock signal $V_{CLK1}$. Capacitors 501, 503, 505, 507, 509, 511, and 513 are coupled to periodic digital clock signal $V_{CLK2}$. Capacitors 502, 504, 506, 508, 510, and 512 are coupled to periodic digital clock signal $V_{CLK4}$. Capacitors 421–433 have a coupling ratio C' that is typically less than one (e.g., about 0.90–0.95). Capacitors 501–513 have a coupling ratio G' that is typically less than one (e.g., about 0.90–0.95).

FETs 461–474 act as diodes that set the initial voltages of $V_1-V_{13}$ and $V_{OUT}$ at $(V_{IN}-V_{T,NAT})$ respectively, where $V_{T,NAT}$ is the threshold voltage of FETs 461–474. When the voltage of any of $V_1-V_{13}$ or $V_{OUT}$ rises above $(V_{IN}-V_{T,NAT})$, corresponding ones of FETs 461–474 turn OFF.

FETs 481–493 act as diodes that set the initial voltages at the gates of FETs 401–413 to $V_{IN}-V_{T,NAT}$, where $V_{T,NAT}$ is the threshold voltage of FETs 481–493. The drains of FETs 481–493 are coupled to receive $V_{IN}$. When the voltage at the source of any of FETs 481–493 rises above $V_{IN}-V_{T,NAT}$, those ones of FETs 481–493 turn OFF.

Figure 5:
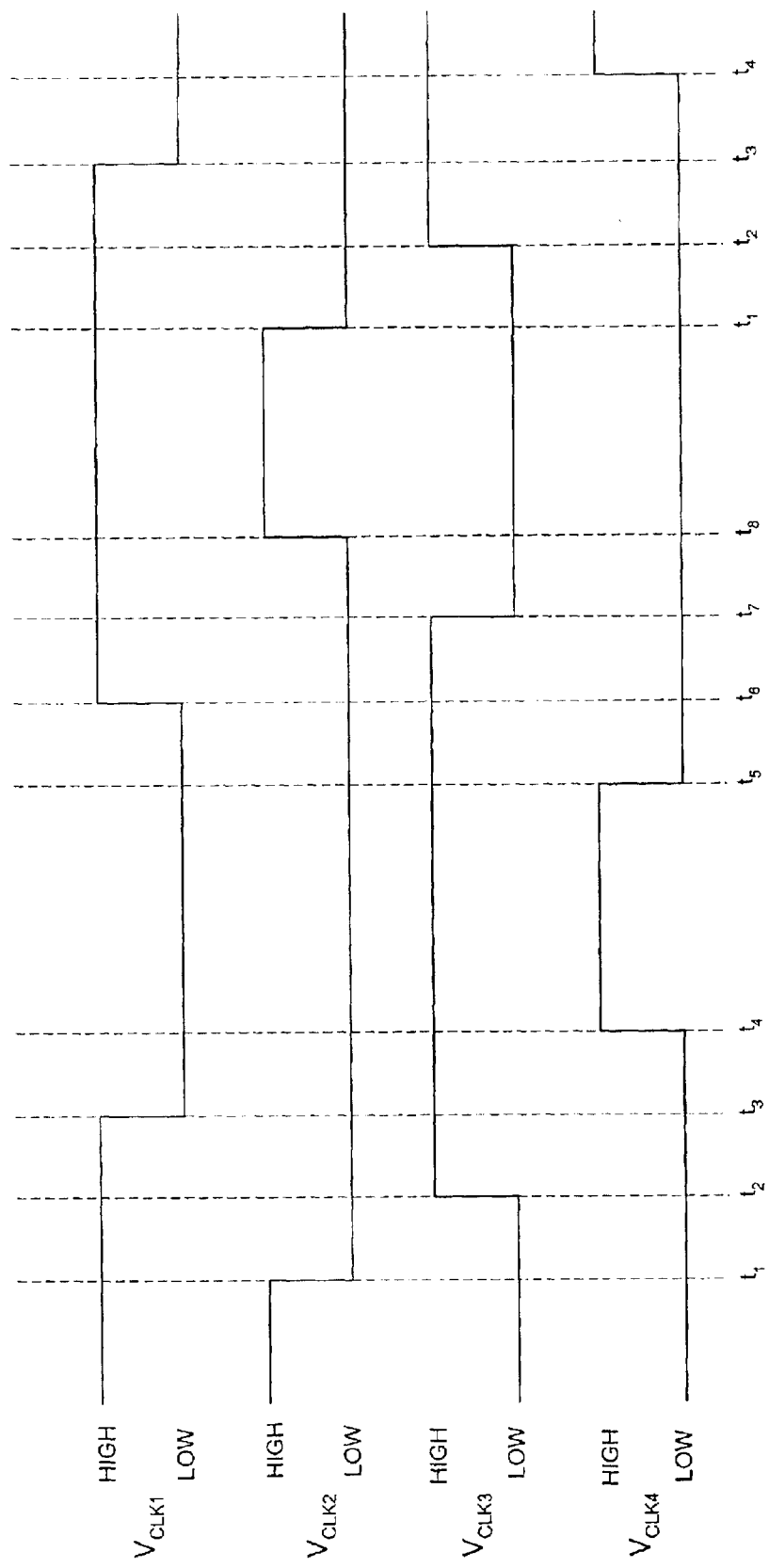
FIG. 5 illustrates waveforms for the clock signals referred to in FIG. 4.

FIG. 5 illustrates the waveforms for clocks signals $V_{CLK1}$, $V_{CLK2}$, $V_{CLK3}$, and $V_{CLK4}$ that are used in charge pump 400 over one clock cycle. Clock signals $V_{CLK1}$, $V_{CLK2}$, $V_{CLK3}$, and $V_{CLK4}$ vary between a supply voltage $V_{CC}$ (HIGH) and 0 volts (LOW). In circuit 400, $V_{CC}$ may equal $V_{IN}$.

When $V_{CLK2}$ is LOW and $V_{CLK3}$ is HIGH, FET 441 is ON, because capacitor 421 raises its gate voltage. FET 441 pulls the gate voltage of FET 401 up to $V_{IN}$. FET 441 turns OFF when $V_{CLK3}$ goes LOW. When $V_{CLK2}$ goes HIGH at time $t_8$, the gate voltage of FET 401 rises to $V_{IN}+(G'*V_{CC})$ through capacitor 501, and FET 401 turns ON. $V_1$ then rises to about $V_{IN}$, if $G'*V_{CC}-V_{IN}$ is greater than the threshold voltage of FET 401.

$V_{CLK2}$ goes LOW at time $t_1$. The gate voltage of FET 401 is now at $V_{IN}$, and FET 401 does not conduct reverse current toward $V_{IN}$, because FET 401 has a positive threshold voltage. FET 441 remains OFF until time $t_2$.

$V_{CLK3}$ goes HIGH at time $t_2$, causing $V_1$ to increase to about $V_{IN}+(C'*V_{CC})$, because of the voltage increase at capacitor 421. $V_{CLK1}$ and $V_{CLK3}$ are HIGH concurrently for a brief time period between times $t_2$ and $t_3$. When $V_{CLK1}$ and $V_{CLK3}$ are HIGH, $V_2$ is typically a threshold voltage above $V_1$ (see discussion of $V_2$ below). Native FET 442 is ON between times $t_2$ and $t_3$, and FET 442 pulls the gate voltage of FET 402 up to about $V_1$. At time $t_3$, $V_{CLK1}$ goes LOW, and FET 442 turns OFF.

At time $t_4$, $V_{CLK4}$ goes HIGH, pulling the gate voltage of FET 402 up to about $V_1+(G'*V_{CC})$ through capacitor 502, so that FET 402 turns ON. Current now flows through FET 402, and $V_2$ increases to about $V_{IN}+(C'*V_{IN})$. FETs 401 and 402 are both native devices with a positive threshold voltage (e.g., 0.3 volts) at a zero source voltage. The gate voltages of FETs 401–402 are pulled above their source voltages by capacitors 501–502, respectively, so that the incremental voltage provided by each of FETs 401–402 is not reduced by the full value of their threshold voltages.

At time $t_5$, $V_{CLK4}$ goes LOW. The gate voltage of FET 402 drops, and FET 402 turns OFF. At time $t_6$, $V_{CLK1}$ goes HIGH, causing $V_2$ to increase to about $V_{IN}+2(C'*V_{CC})$. $V_{CLK1}$ and $V_{CLK3}$ are HIGH concurrently for a brief period between times $t_6$ and $t_7$. When $V_{CLK1}$ and $V_{CLK3}$ are HIGH, $V_3$ is typically a threshold voltage above $V_2$ (see discussion of $V_3$ below). Native FET 443 is ON between times $t_6$ and $t_7$, and FET 443 pulls the gate of FET 403 up to about $V_2$. At time $t_7$, $V_{CLK3}$ goes LOW, and FET 443 turns OFF.

At time $t_8$, $V_{CLK2}$ goes HIGH, pulling the gate voltage of depletion FET 403 up to about $V_2+(G'*V_{CC})$ through capacitor 503, so that FET 403 turns ON. Current now flows to the right through FET 403, and voltage $V_3$ rises close to $V_{IN}+2(C'\cdot V_{CC})$. FETs 403–414 are depletion devices that have threshold voltages less than zero at a zero source voltage.

The clock cycle shown in FIG. 5 then repeats. When $V_{CLK2}$ goes LOW again at $t_1$, the gate voltage of FET 403 drops. When $V_{CLK3}$ goes HIGH ($t_2$), $V_3$ rises to about $V_{IN}+3(C'*V_{CC})$. Native FET 444 is ON between times $t_2$ and $t_3$ when $V_{CLK1}$ and $V_{CLK3}$ are HIGH, and FET 444 pulls the gate of FET 404 up to about $V_3$. At time $t_3$, $V_{CLK1}$ goes LOW, and FET 444 turns OFF.

When $V_{CLK4}$ goes HIGH ($t_4$), the gate voltage of depletion FET 404 is pulled up to about $V_3+(G'\cdot V_{CC})$ through capacitor 504, and FET 404 turns ON. Voltage $V_4$ now rises to about $V_{IN}+3(C'\cdot V_{CC})$. The cycle then repeats for each stage from FETs 405–413 to provide a high voltage output $V_{OUT}$. FET 414 acts as a diode, which blocks reverse current from flowing away from $V_{OUT}$.

The threshold voltages of FETs 441–453 get progressively higher as their source voltages get progressively higher. FETs 448–453 are depletion devices, which have lower threshold voltages than comparatively biased native FETs 441–447. Depletion FETs 448–453 have threshold voltages that are low enough to turn ON when $V_{CLK1}$ and $V_{CLK3}$ are HIGH.

In charge pump 400, FETs 441–453 pull the gate voltages of FETs 401–413 up to $V_{IN}$ and $V_1$–$V_{12}$, respectively, during brief time intervals. Subsequently, capacitors 501–513 couple the gate voltages of FETs 401–413 above $V_{IN}$ and $V_1$–$V_{12}$, respectively, when a corresponding one of clock signals $V_{CLK2}/V_{CLK4}$ goes HIGH, as discussed above. The architecture of circuit 400 allows each one of FETs 401–413 to provide a higher percentage of its drain voltage (left side of FET) to its source (right side of FET) when it turns ON, because the gate voltages of FETs 401–413 are driven higher than their source voltages $V_1$–$V_{13}$. Therefore, the threshold voltages of FETs 401–413 do not reduce the incremental voltage increase provided by each stage to $V_{OUT}$ as much as FETs 802–817 in circuit 390. However, the incremental voltage increase provided by high voltage stages of charge pump 400 may still be reduced by a portion of the threshold voltage of the FET 401–413 in that stage, if the threshold voltage is large enough.

Reverse current may flow through some of FETs 403–413 away from $V_{OUT}$, as discussed with respect to depletion devices 803–817. However, the net current flow in circuit 400 is toward $V_{OUT}$. Each subsequent depletion FET from FET 403 through FET 414 has a greater threshold voltage than the previous depletion FET as discussed above with respect to previous embodiments.

Charge pump 400 can step up an input voltage to greater output voltage using less stages than are required in the embodiment of FIG. 3. For example, charge pump 400 can step up an input voltage of 1.6 volts to an output voltage of 15 volts using 13 stages, wherein charge pump 390 requires 16 stages to achieve the same output voltage for a 1.6 volt input.

Charge pump 400 saves a significant amount of space, because it requires less stages and less capacitors 421–433 than charge pump 390. Charge pump 400 does require 13 additional capacitors 501–513, which are not used in charge pump 390. However, capacitors 501–513 are on the order of, for example, 50–100 smaller than capacitors 421–433. Therefore, pump 400 achieves a significant amount of space savings in terms of capacitor area.

In a further embodiment of the present invention, two types of n-channel depletion field-effect transistors are used to create a multi-stage charge pump. The first type of depletion FET can be fabricated to obtain a first negative threshold voltage as shown and discussed with respect to FIG. 2. The second type of n-channel depletion FET includes an n-type dopant implant in the channel that has a higher n-type doping concentration than the implant in region 261 of device 260. The second type of depletion FET has a second negative threshold voltage that is lower than the first negative threshold voltage at a zero source bias.

The second type of n-channel FETs can be used in the highest voltage stages of a charge pump circuit to further reduce the threshold voltages of these FETs. The reduced threshold voltage provides a greater incremental voltage across the highest stages of the charge pump. For example, FETs 811–817 in pump 390 can be replaced with the second type of depletion FET. Thus, this embodiment contains stages with native FETs and two types of depletion FETs. The second type of depletion FET can reduce the number of stages in a charge pump or provide a higher output voltage. This embodiment requires additional mask and implant steps to fabricate the two types of depletion devices. In further embodiments, third and fourth types of depletion FETs with progressively lower threshold voltages are used in the higher voltage stages of a charge pump circuit.

In further embodiments, the concept of FETs used in the embodiments shown in the FIGS. can be applied to a pchannel FET charge pump. Some or all of the p-channel FETs in a p-channel charge pump can be replaced with depletion p-channel FETs. A depletion p-channel FET can be created by implanting a p-type implant in the n-type channel region to change the threshold voltage.

In further embodiments, charge pump circuits of the present invention may include any number of suitable stages coupled together to achieve a desired output voltage. For example, a charge pump of the present invention may include 1 stage, 2 stages, 3 stages, 4 stages, 5 stages, 6 stages, 7 stages, 8 stages, 9 stages, 10 stages, 11 stages, 12 stages, 13 stages, 14 stages, 15 stages, or 16 stages. A charge pump circuit of the present invention may contain only one stage that includes a depletion FET and a capacitor, wherein the voltage on the capacitor is pumped up and down to supply the output voltage. A diode-connected FET may be coupled between the depletion FET and $V_{OUT}$.

In further embodiments of the present invention, the first one or two stages that have native FETs may be eliminated. Each charge pump stage in this embodiment has a depletion FET along the current path from input to output voltage. This embodiment is advantageous at higher input voltages at which the first stage depletion FET has a positive threshold voltage to prevent reverse current toward $V_{IN}$.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention will include all embodiments and equivalents falling within the scope of the claims.

What is claimed is:

1. A charge pump circuit comprising:
   a first native transistor;
   first depletion transistors each having a threshold voltage that is lower that a threshold voltage of the first native transistor at a common source voltage;
   second depletion transistors each having a threshold voltage that is lower than the threshold voltage of each of the first depletion transistors at a common source voltage; and
   first capacitors that are each coupled to a drain of one of the first or the second depletion transistors, wherein a first subset of the first capacitors are coupled to receive a first clock signal, and a second subset of the first capacitors are coupled to receive a second clock signal;
   and wherein the first native transistor, the first depletion transistors, and the second depletion transistors are all coupled together in series between an input and an output of the charge pump circuit.

2. The charge pump circuit of claim 1 wherein the first depletion transistors include at least four depletion transistors, and the second depletion transistors include at least four depletion transistors.

3. The charge pump circuit of claim 2 wherein the first depletion transistors include at least six depletion transistors, and the second depletion transistors include at least six depletion transistors.

4. The charge pump circuit of claim 1 further comprising diode-connected transistors, wherein each diode connected transistor is coupled to a gate of one of the first depletion transistors.

5. The charge pump circuit of claim 3 wherein the first depletion transistors include at least seven depletion transistors, and the second depletion transistors include at least seven depletion transistors.

6. The charge pump circuit of claim 1 further comprising:
   a second native transistor that is coupled in series with the first native transistor.

7. The charge pump circuit of claim 1 wherein each of the first depletion transistors have a negative threshold voltage implant region with a first concentration of an N-type dopant, and each of the second depletion transistors have a negative threshold implant region with a second concentration of the N-type dopant, the second concentration of the N-type dopant being greater than the first concentration of the N-type dopant.

8. The charge pump circuit of claim 1 further comprising:
   second capacitors, wherein a gate of each of the first and the second depletion transistors and the first native transistor is coupled to one of the second capacitors, a first subset of the second capacitors are coupled to receive a third clock signal, and a second subset of the second capacitors are coupled to receive a fourth clock signal.

9. A charge pump circuit comprising:
   a first native transistor;
   first depletion transistors each having a threshold voltage that is lower that a threshold voltage of the first native transistor at a common source voltage, wherein the first native transistor and the first depletion transistors are coupled together in series between an input and an output of the charge pump circuit;
   first capacitors, wherein a drain of each of the first depletion transistors is coupled to one of the first capacitors, a first subset of the first capacitors are coupled to receive a first clock signal, and a second subset of the first capacitors are coupled to receive a second clock signal;
   a second native transistor coupled to a gate, a drain, and a source of the first native transistor; and
   third native transistors, wherein a gate, the drain, and a source of each of the first depletion transistors are coupled to one of the third native transistors.

10. A method for receiving an input voltage and providing a boosted output voltage, the method comprising:
    boosting the input voltage by applying a first clock signal to a drain of a first native transistor;
    boosting a source voltage of the first native transistor by applying the first clock signal and a second clock signal to a drain and a source of each of a first set of depletion transistors are coupled together in series to provide an output voltage,
    the first set of depletion transistors each having a threshold voltage that is lower that a threshold voltage of the first native transistor at a common source voltage; and
    boosting the output voltage of the first native transistors by applying the first clock signal and the second clock signal to a drain and a source of each of a second set of depletion transistors that are coupled together in series and to the first depletion transistors,
    the second set of depletion transistors each having a threshold voltage that is lower than the threshold voltage of each of the first set of depletion transistors at a common source voltage.

11. The method of claim 10 wherein the gate of each of the first and the second sets of depletion transistors and the first native transistor is coupled to receive a third clock signal or a fourth clock signal.

12. The method of claim 11 wherein the first set of depletion transistors includes at least four depletion transistors, and the second set of depletion transistors includes at least four depletion transistors.

13. The method of claim 12 wherein the first set of depletion transistors includes at least six depletion transistors, and the second set of depletion transistors includes at least six depletion transistors.

14. The method of claim 13 wherein the first set of depletion transistors includes at least seven depletion transistors, and the second set of depletion transistors includes at least seven depletion transistors.

15. The method of claim 11 wherein each of the first set of depletion transistors has a negative threshold voltage implant region with a first concentration of dopant, and each of the second set of depletion transistors has a negative threshold implant region with a second concentration of dopant, the second concentration of dopant being greater than the first concentration of dopant.

16. The method of claim 10 wherein:
   a second native transistor is coupled to a gate, a drain, and source of the first native transistor; and
   third native transistors that are each coupled to a gate, the drain, and the source of one of the first or the second depletion transistors.

17. A charge pump circuit comprising:
   a first native transistor;
   first depletion transistors each having a threshold voltage that is lower that a threshold voltage of the first native transistor at a common source voltage;
   second depletion transistors each having a threshold voltage that is lower than the threshold voltage of each of the first depletion transistors at a common source voltage, wherein the first native transistor, the first depletion transistors, and the second depletion transistors are all coupled in series between an input and an output of the charge pump circuit;
   first capacitors that are each coupled to a first clock signal and to one of the first or the second depletion transistors; and
   second capacitors that are each coupled to a second clock signal and to one of the first or the second depletion transistors.

18. The charge pump circuit of claim 17 wherein the first and second clock signals are HIGH concurrently for a fraction of a clock period.

19. The charge pump circuit of claim 18 further comprising:
   third and fourth capacitors that are coupled to gates of alternating ones of the first and the second depletion transistors.

20. The charge pump circuit of claim 19 wherein the third capacitors are coupled to receive a third clock signal, the fourth capacitors are coupled to receive a fourth clock signal, and the third and the fourth clock signals having non-overlapping HIGH pulses.

21. The charge pump circuit of claim 17 wherein the first depletion transistors include at least four depletion transistors, and the second depletion transistors include at least four depletion transistors.

22. The charge pump circuit of claim 17 wherein the first depletion transistors include at least six depletion transistors, and the second depletion transistors include at least six depletion transistors.

23. The charge pump circuit of claim 17 further comprising:
   a second native transistor that is coupled in series with the native transistor.

24. The charge pump circuit of claim 17 further comprising:
   a second native transistor coupled to a gate, drain, and source of the first native transistor; and
   third native transistors that are each coupled to a gate, a drain, and a source of one of the first or second depletion transistors.

* * * * *